US012784415B2

(12) United States Patent
Li et al.

(10) Patent No.: US 12,784,415 B2
(45) Date of Patent: Nov. 3, 2026

(54) MULTI-MODAL PRE-TRAINING METHOD AND MULTI-MODAL PRE-TRAINING APPARATUS

(71) Applicant: BEIJING JINGDONG SHANGKE INFORMATION TECHNOLOGY CO., LTD., Beijing (CN)

(72) Inventors: Yehao Li, Beijing (CN); Yingwei Pan, Beijing (CN); Ting Yao, Beijing (CN); Tao Mei, Beijing (CN)

(73) Assignee: BEIJING JINGDONG SHANGKE INFORMATION TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 18/692,000

(22) PCT Filed: May 13, 2022

(86) PCT No.: PCT/CN2022/092680
§ 371 (c)(1),
(2) Date: Mar. 14, 2024

(87) PCT Pub. No.: WO2023/040306
PCT Pub. Date: Mar. 23, 2023

(65) Prior Publication Data

US 2024/0378865 A1 Nov. 14, 2024

(30) Foreign Application Priority Data

Sep. 15, 2021 (CN) ......................... 202111078728.2

(51) Int. Cl.
*G06V 10/774* (2022.01)
*G06F 40/279* (2020.01)
(Continued)

(52) U.S. Cl.
CPC .......... *G06V 10/774* (2022.01); *G06F 40/279* (2020.01); *G06F 40/40* (2020.01);
(Continued)

(58) Field of Classification Search
CPC .... G06V 10/774; G06V 10/42; G06V 10/806; G06V 20/46; G06V 10/82; G06F 40/279;
(Continued)

(56) References Cited

U.S. PATENT DOCUMENTS

2021/0174162 A1 6/2021 Le et al.
2022/0019744 A1* 1/2022 Yu .......................... G06F 40/56
(Continued)

FOREIGN PATENT DOCUMENTS

CN 111309971 A 6/2020
CN 112001180 A 11/2020
(Continued)

OTHER PUBLICATIONS

Li, L., Chen, Y. C., Cheng, Y., Gan, Z., Yu, L., & Liu, J. (Nov. 2020). Hero: Hierarchical encoder for video+ language omni-representation pre-training. In Proceedings of the 2020 conference on empirical methods in natural language processing ( EMNLP) (pp. 2046-2065) (Year: 2020).*
(Continued)

*Primary Examiner* — Stephen R Koziol
*Assistant Examiner* — Michael Kim Maiden
(74) *Attorney, Agent, or Firm* — Myers Bigel, P.A.

(57) ABSTRACT

The present disclosure provides a multi-modal pre-training method and apparatus. The method includes: sampling a video in a video-text pair to obtain a first video frame sequence; performing word segmentation processing on a text in the video-text pair to obtain a first word segmentation sequence; masking on the first video frame sequence to obtain a second video frame sequence; masking on the first
(Continued)

word segmentation sequence to obtain a second word segmentation sequence; encoding the first video frame sequence to obtain a first video feature, and encoding the first word segmentation sequence to obtain a first word segmentation feature; encoding the second video frame sequence to obtain a second video feature, and encoding the second word segmentation sequence to obtain a second word segmentation feature; performing multi-modal pre-training by using the first video feature, the first word segmentation feature, the second video feature and the second word segmentation feature.

18 Claims, 4 Drawing Sheets

(51) Int. Cl.

| | |
|---|---|
| ***G06F 40/40*** | (2020.01) |
| ***G06V 10/42*** | (2022.01) |
| ***G06V 10/80*** | (2022.01) |
| ***G06V 20/40*** | (2022.01) |

(52) U.S. Cl.
CPC ............ *G06V 10/42* (2022.01); *G06V 10/806* (2022.01); *G06V 20/46* (2022.01)

(58) Field of Classification Search
CPC .......... G06F 40/40; G06F 40/30; G06F 18/22; G06F 18/253; G06F 40/289; G06F 16/483
See application file for complete search history.

(56) References Cited

U.S. PATENT DOCUMENTS

| | | | |
|---|---|---|---|
| 2022/0284246 A1 | 9/2022 | He et al. | |
| 2022/0327809 A1 | 10/2022 | Li et al. | |
| 2024/0054767 A1* | 2/2024 | Li | G06F 40/51 |

FOREIGN PATENT DOCUMENTS

| | | | |
|---|---|---|---|
| CN | 112241468 | A | 1/2021 |
| CN | 112990297 | A | 6/2021 |
| CN | 113033622 | A | 6/2021 |
| CN | 113239153 | A | 8/2021 |
| CN | 113239159 | A | 8/2021 |
| CN | 113240056 | A | 8/2021 |
| CN | 113257238 | A | 8/2021 |
| CN | 113283551 | A | 8/2021 |
| CN | 113780194 | A | 12/2021 |
| WO | 2021169288 | A1 | 9/2021 |

OTHER PUBLICATIONS

"International Search Report and Written Opinion of the International Searching Authority", with English language translation, International Application No. PCT/CN2022/092680, Jun. 27, 2022, 17 pp.

"Notice of the First Examination Opinion", CN Application No. 202111078728.2, Aug. 10, 2024, 14 pp.

The Third Examination Opinion Notice and English language translation, CN Application No. 202111078728.2, Nov. 27, 2025, 12 pp.

* cited by examiner

MULTI-MODAL PRE-TRAINING METHOD AND MULTI-MODAL PRE-TRAINING APPARATUS

CROSS-REFERENCE TO RELATED APPLICATIONS

The present application is a U.S. National Stage Application under 35 U.S.C. § 371 of International Patent Application No. PCT/CN2022/092680, filed on May 13, 2022, which is based on and claims priority from CN application No. 202111078728.2 filed on Sep. 15, 2021, the disclosure of both of which are hereby incorporated herein by reference in their entireties.

TECHNICAL FIELD

The present disclosure relates to the field of information processing, and in particular, to a multi-modal pre-training method and a multi-modal pre-training apparatus.

BACKGROUND

The multi-modal pre-training technology for visual language is one of recently emerging subjects in the multi-modal field, which aims at enabling a model to pre-train large-scale weakly labeled visual data (such as images and videos) and text data to obtain a better multi-modal feature representation, thereby improving the performance of various multi-modal task models.

Technologies related to the multi-modal pre-training for the visual language are basically methods of pre-training a model with reference to BERT (Bidirectional Encoder Representations From Transformer) in the field of natural language processing.

SUMMARY

According to a first aspect of embodiments of the present disclosure, there is provided a multi-modal pre-training method, comprising: sampling a video in a video-text pair to obtain a first video frame sequence; performing word segmentation processing on a text in the video-text pair to obtain a first word segmentation sequence; masking on the first video frame sequence to obtain a second video frame sequence; masking on the first word segmentation sequence to obtain a second word segmentation sequence; encoding the first video frame sequence to obtain a first video feature, and encoding the first word segmentation sequence to obtain a first word segmentation feature; encoding the second video frame sequence to obtain a second video feature, and encoding the second word segmentation sequence to obtain a second word segmentation feature; determining a pre-trained target function by using the first video feature, the first word segmentation feature, the second video feature and the second word segmentation feature; and performing multi-modal pre-training by using the pre-trained target function.

In some embodiments, the determining a pre-trained target function comprises: determining a first contrastive loss value by using the first word segmentation feature, the second video feature and a preset first negative sample feature; determining a second contrastive loss value by using the first video feature, the second word segmentation feature and a preset second negative sample feature; determining a first target based on the first contrastive loss value and second contrastive loss value; determining a third contrastive loss value by using the first video feature, the second video feature, and the second negative sample feature; determining a fourth contrastive loss value by using the first word segmentation feature, the second word segmentation feature, and the first negative sample feature; determining a second target according to the third contrastive loss value and the fourth contrastive loss value; and determining the target function according to the first target and the second target.

In some embodiments, the determining a first contrastive loss value comprises: converting the first word segmentation feature into a global first positive sample feature; converting the second video feature into a global video query feature; and determining a first contrastive loss value by using the video query feature, the first positive sample feature, and the first negative sample feature.

In some embodiments, the determining a second contrastive loss value comprises: converting the first video feature into a global second positive sample feature; converting the second word segmentation feature into a global text query feature; and determining a second contrastive loss value by using the text query feature, the second positive sample feature, and the second negative sample feature.

In some embodiments, the determining a third contrastive loss value comprises: determining a third contrastive loss value by using the video query feature, the second positive sample feature, and the second negative sample feature.

In some embodiments, determining a fourth contrastive loss value comprises: determining a fourth contrastive loss value by using the text query feature, the first positive sample feature, and the first negative sample feature.

In some embodiments, the first target is a sum of the first contrastive loss value and the second contrastive loss value; and the second target is a sum of the third contrastive loss value and the fourth contrastive loss value.

In some embodiments, the target function is a sum of the first target and the second target.

In some embodiments, fusing the second video feature and the second word segmentation feature to obtain a fused feature; and inputting the fused feature into a masked language modelling (MLM) model to obtain a third target, and inputting the fused feature into a masked language generating (MSG) model to obtain a fourth target; and the determining the target function according to the first target and the second target comprising: determining the target function according to the first target, the second target, the third target and the fourth target.

In some embodiments, the target function is a sum of the first target, the second target, the third target, and the fourth target.

According to a second aspect of embodiments of the present disclosure, there is provided a multi-modal pre-training apparatus, comprising: a first processing module configured to sample a video in a video-text pair to obtain a first video frame sequence, and perform word segmentation processing on a text in the video-text pair to obtain a first word segmentation sequence; a second processing module configured to mask on the first video frame sequence to obtain a second video frame sequence, and mask on the first word segmentation sequence to obtain a second word segmentation sequence; a third processing module configured to encode the first video frame sequence to obtain a first video feature, and encode the first word segmentation sequence to obtain a first word segmentation feature; a fourth processing module configured to encode the second video frame sequence to obtain a second video feature, and encode the second word segmentation sequence to obtain a second word segmentation feature; a fifth processing module configured to determine a pre-trained target function by using the first video feature, the first word segmentation feature, the second video feature and the second word segmentation feature; and a sixth processing module configured to perform multi-modal pre-training by using the pre-trained target function.

According to a third aspect of embodiments of the present disclosure, there is provided a multi-modal pre-training apparatus, comprising: a memory; and a processor coupled to the memory, which is configured to execute the method according to any one of the embodiments described above.

According to a fourth aspect of embodiments of the present disclosure, there is provided a non-transitory computer-readable storage medium, wherein the computer-readable storage medium stores computer instructions, which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, drawings used in the embodiments or the description of the prior art will be briefly described below. It is obvious that the drawings in the following description are only some embodiments of the present disclosure, and for those skilled in the art, other drawings may be obtained according to the drawings without inventive labor.

DETAILED DESCRIPTION

The technical solutions in the embodiments of the present disclosure in a clear and complete manner with reference to the figures in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without paying inventive effort, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the figures are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that similar reference numbers and letters refer to similar items in the following figures, and thus, once an item is defined in one figure, it need not be discussed further in subsequent figures.

The inventors find that in the related art, in order to mine the connection between two modalities, the video text multi-modal pre-training technology only utilizes a masked input video text to learn the relevance of the global feature representation during the pre-training period, and such a learning manner fails to enable sufficient exploration of the overall video-text relation between the input video frame and the word sequence, thereby causing a degradation in the quality of multi-modal features.

Accordingly, a multi-modal pre-training scheme is provided by the present disclosure, which can enhance the relevance between cross-modal data and effectively improve the comprehension capability of a multi-modal pre-training model on multi-modal data contents.

Figure 1:
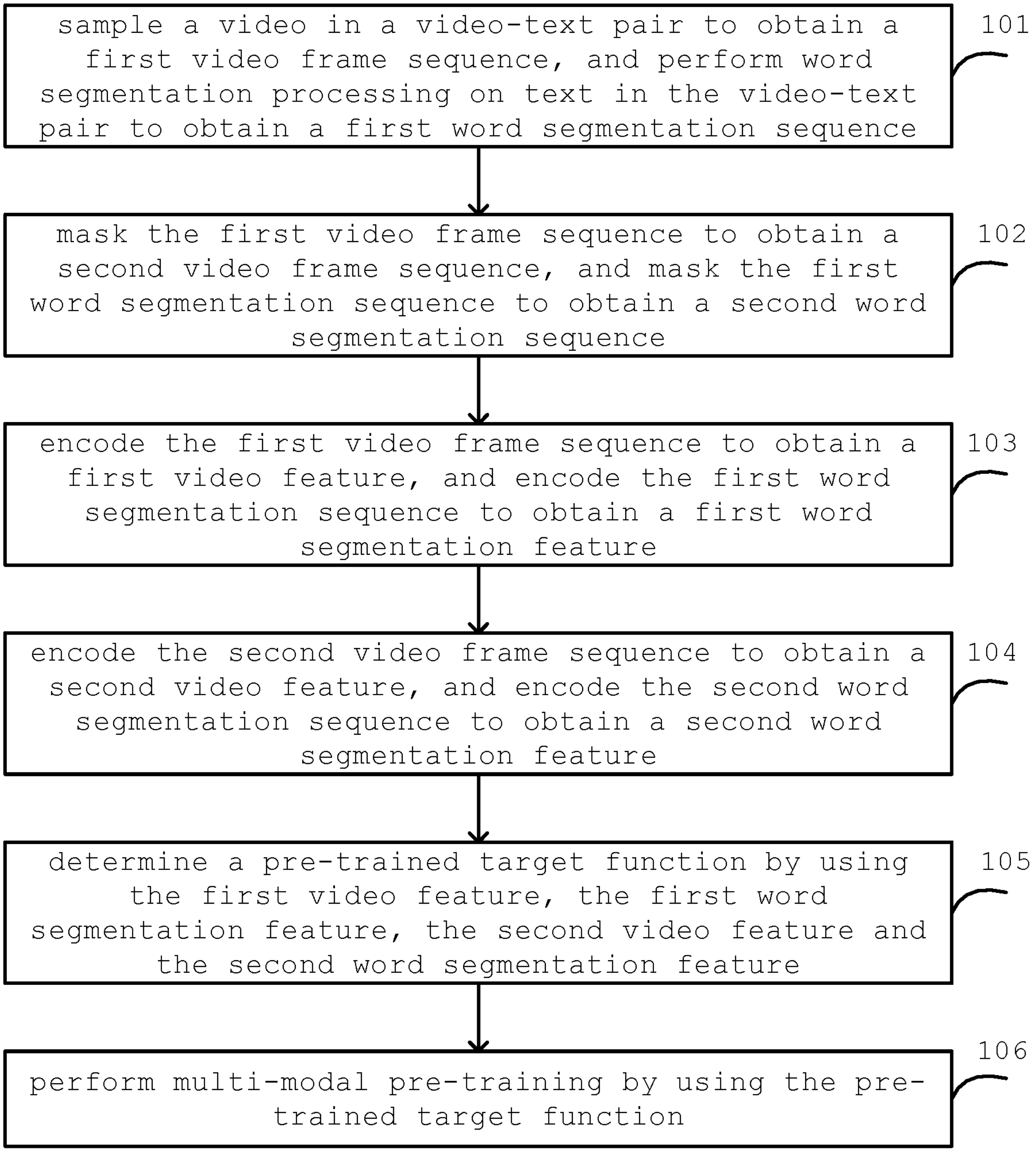
FIG. 1 is a schematic flow chart diagram of a multi-modal pre-training method according to one embodiment of the present disclosure.

FIG. 1 is a schematic flow chart diagram of a multi-modal pre-training method according to one embodiment of the present disclosure. In some embodiments, the following multi-modal pre-training method is performed by a multi-modal pre-training apparatus.

In step 101, a video in a video-text pair is sampled to obtain a first video frame sequence, and a word segmentation process is performed on a text in the video-text pair to obtain a first word segmentation sequence.

In some embodiments, the video is sampled in an equidistant sampling manner to obtain the first video frame sequence.

In some embodiments, flag [CLS] and flag [SEP] are respectively provided at the beginning and end of the first word segmentation sequence for convenience of subsequent processing.

In step 102, the first video frame sequence is masked to obtain a second video frame sequence, and the first word segmentation sequence is masked to obtain a second word segmentation sequence.

In some embodiments, video frames in the first video frame sequence are replaced with masks at a random probability to obtain a second video frame sequence.

In some embodiments, word segments in the first word segmentation sequence are replaced with masks at a random probability to obtain a second word segmentation sequence.

In step 103, the first video frame sequence is encoded to obtain a first video feature, and the first word segmentation sequence is encoded to obtain a first word segmentation feature.

In some embodiments, the first video frame sequence is encoded by using a Video Key Encoder to obtain a first video feature, and the first word segmentation sequence is encoded by using a Sentence Key Encoder to obtain a first word segmentation feature.

The first video feature outputted from the video key encoder reflects contextual characteristics of unmasked video frames. The first word segmentation feature outputted from the sentence key encoder reflects contextual characteristics of unmasked word segmentation sequences.

Since the video key and the sentence key are not inventive focus of the present disclosure, they will not be described in detail here.

In step 104, the second video frame sequence is encoded to obtain a second video feature, and the second word segmentation sequence is encoded to obtain a second word segmentation feature.

In some embodiments, the second video frame sequence is encoded by using a Video Query Encoder to obtain a second video feature, and the second word segmentation sequence is encoded by using a Sentence Query Encoder to obtain a second word segmentation feature.

The second video feature outputted from the video query encoder reflects a relevance between frames in the video modality, and the second word segmentation feature outputted from the sentence query encoder reflects a relevance between words in the text modality.

Since the video query encoder and the sentence query encoder are not inventive focus of the present disclosure, they will not be described in detail here.

In step 105, a pre-trained target function is determined by using the first video feature, the first word segmentation feature, the second video feature and the second word segmentation feature.

Figure 2:
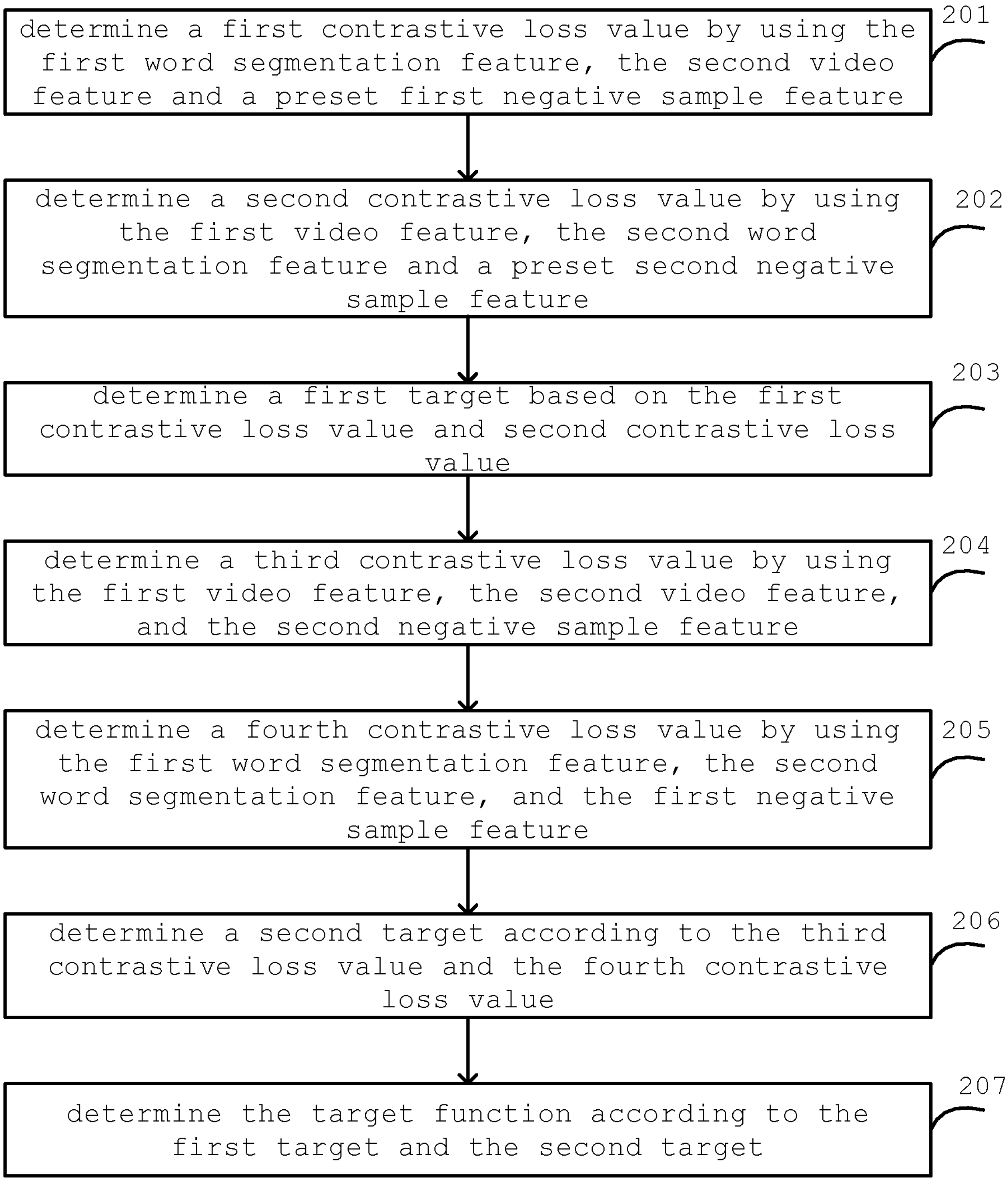
FIG. 2 is a schematic flow chart diagram of a multi-modal pre-training method according to another embodiment of the present disclosure.

In some embodiments, determining the pre-trained target function is as illustrated in FIG. 2.

In step 201, a first contrastive loss value is determined by using the first word segmentation feature, the second video feature and a preset first negative sample feature.

In some embodiments, the first word segmentation feature is converted to a global first positive sample feature $$H_s^+$$

by using an MLP (Multi-layer Perceptron) model, and the second video feature is converted to a global video query feature $$H_v^m$$

by using the MLP model. The first contrastive loss value is determined by using the video query feature $$H_v^m,$$

the first positive sample feature $$H_s^+$$

and a first negative sample feature $$K_S^-.$$

It should be noted that the first negative sample feature $$K_S^-$$

is represented by the following Formula:

$$K_S^- = \{H_{S,i}^-\}_{i=1}^K \quad (1)$$

In the Formula (1), K represents a size of a negative sample queue included in the first negative sample feature, and $$H_{S,i}^-$$

represents the ith negative sample in the negative sample queue.

In some embodiments, the first contrastive loss value $$L_{NCE}^{V\to S}(H_V^m, H_S^+, K_S^-)$$

is calculated according to Formula (2)

$$L_{NCE}^{V\to S}(H_V^m, H_S^+, K_S^-) = -\log\frac{\exp(\langle H_V^m, H_S^+\rangle/t)}{\exp\left(\frac{\langle H_V^m, H_S^+\rangle}{t}\right) + \Sigma_{i=1}^K \exp(\langle H_V^m, H_{S,i}^-\rangle/t)} \quad (2)$$

In the Formula (2), t is a hyper-parameter for controlling scaling. The operator <A, B> represents a cosine similarity of the vectors A and B.

In step 202, a second contrastive loss value is determined by using the first video feature, the second word segmentation feature and a preset second negative sample feature.

In some embodiments, the first video feature is converted to a global second positive sample feature $$H_v^+$$

by using the MLP model, and the second word segmentation feature is converted to a global text query feature $$H_s^m$$

by using the MLP model. The second contrastive loss value is determined by using the text query feature $$H_s^m,$$

the second positive sample feature $$H_v^+,$$

and a second negative sample feature $$K_V^-.$$

It should be noted that the second negative sample feature $$K_V^-$$

is represented by the following Formula:

$$K_V^- = \{H_{V,i}^-\}_{i=1}^K \tag{3}$$

In the Formula (3), K represents a size of a negative sample queue included in the second negative sample feature and $$H_{V,i}^-$$

represents the ith negative sample in the negative sample queue.

In some embodiments, the second contrastive loss value $$L_{NCE}^{V\to S}(H_S^m, H_V^+, K_V^-)$$

is calculated according to Formula (4):

$$L_{NCE}^{S\to V}(H_S^m, H_V^+, K_V^-) = -\log\frac{\exp(\langle H_S^m, H_V^+\rangle/t)}{\exp\left(\frac{\langle H_S^m, H_V^+\rangle}{t}\right) + \Sigma_{i=1}^K \exp(\langle H_S^m, H_{V,i}^-\rangle/t)} \tag{4}$$

In the Formula (4), t is a hyper-parameter for controlling scaling. The operator <A, B> represents a cosine similarity of the vectors A and B.

In step 203, a first target is determined based on the first contrastive loss value and the second contrastive loss value.

In some embodiments, the first target is a sum of the first contrastive loss value and the second contrastive loss value. For example, the first target is calculated according to Formula (5). The first target is used to represent a combination of video-to-text and text-to-video video matching losses.

$$L_{Co-IM} = L_{NCE}^{V\to S}(H_V^m, H_S^+, K_S^-) + L_{NCE}^{S\to V}(H_S^m, H_V^+, K_V^-) \tag{5}$$

In step 204, a third contrastive loss value is determined by using the first video feature, the second video feature and the second negative sample feature.

In some embodiments, the third contrastive loss value is determined by using the video query feature $$H_V^m,$$

the second positive sample feature $$H_V^+,$$

and the second negative sample feature $$K_V^-.$$

In some embodiments, the third contrastive loss value $$L_{NCE}^V(H_V^m, H_V^+, K_V^-)$$

is calculated according to Formula (6):

$$L_{NCE}^V(H_V^m, H_V^+, K_V^-) = -\log\frac{\exp(\langle H_V^m, H_V^+\rangle/t)}{\exp\left(\frac{\langle H_V^m, H_V^+\rangle}{t}\right) + \Sigma_{i=1}^K \exp(\langle H_V^m, H_{V,i}^-\rangle/t)} \tag{6}$$

In Formula (6), t is a hyper-parameter for controlling scaling. The operator <A, B> represents a cosine similarity of the vectors A and B.

In step 205, a fourth contrastive loss value is determined by using the first word segmentation feature, the second word segmentation feature, and the first negative sample feature.

In some embodiments, the fourth contrastive loss value is determined by using the text query feature $$H_s^m,$$

the first positive sample feature $$H_s^+,$$

and the first negative sample feature $$K_S^-.$$

In some embodiments, a fourth contrastive loss value $$L_{NCE}^S(H_S^m, H_S^+, K_s^-)$$

is calculated according to Formula (7):

$$L_{NCE}^S(H_S^m, H_S^+, K_S^-) = -\log\frac{\exp(\langle H_S^m, H_S^+\rangle/t)}{\exp\left(\frac{\langle H_S^m, H_S^+\rangle}{t}\right) + \Sigma_{i=1}^K \exp(\langle H_S^m, H_{S,i}^-\rangle/t)} \tag{7}$$

In Formula (7), t is a hyper-parameter for controlling scaling. The operator <A, B> represents a cosine similarity of the vectors A and B.

In step 206, a second target is determined based on the third contrastive loss value and the fourth contrastive loss value.

In some embodiments, the second target is a sum of the third contrastive loss value and the fourth contrastive loss value. The second target is calculated, for example, according to Formula (8). The second target is used to represent denoising losses within a video modality and within a text modality.

$$L_{Co-ID} = L_{NCE}^{V}(H_V^m, H_V^+, K_V^-) + L_{NCE}^{S}(H_S^m, H_S^+, K_S^-) \quad (8)$$

In step 207, a target function is determined based on the first target and the second target.

In some embodiments, the target function is a sum of the first target and the second target. For example, the target function L is calculated according to Formula (9):

$$L = L_{Co-IM} + L_{Co-ID} \quad (9)$$

Returning to FIG. 1. In step 106, a multi-modal pre-training is performed by using the pre-trained target function.

In the multi-modal pre-training method provided by the embodiment of the present disclosure, the pre-trained target function is determined based on a cross-modal matching loss and an intra-modal denoising loss, such that a correlation between cross-modal data can be enhanced, and a comprehension capability of the multi-modal pre-training model to the contents of multi-modal data is effectively improved.

In some embodiments, the second video feature and the second word segmentation feature are fused to obtain a fused feature. The fused feature is inputted into an MLM (Masked Language Modelling) model to obtain a third target $L_{MLM}$, and the fused feature is inputted into an MSG (Masked Language Generation) model to obtain a fourth target $L_{MSG}$.

In some embodiments, the second video feature and the second word segmentation feature are fused by using a Cross-Modal Decoder to obtain a fused feature. The cross-modal decoder is used for outputting fused feature of the multi-modal information of the video and the text and providing feature inputs for subsequent tasks.

Since the cross-modal decoder is not an inventive focus of the present disclosure, it is not described here in detail.

In some embodiments, the target function L is determined based on a first target $L_{Co-IM}$, a second target $L_{Co-ID}$, a third target $L_{MLM}$, and a fourth target $L_{MSG}$.

In some embodiments, the target function L is a sum of the first target $L_{Co-IM}$, a second target $L_{Co-ID}$, a third target $L_{MLM}$, and a fourth target $L_{MSG}$.

For example, the target function L is calculated according to the following Formula (10):

$$L = L_{Co-IM} + L_{Co-ID} + L_{MLM} + L_{MSG} \quad (10)$$

Figure 3:
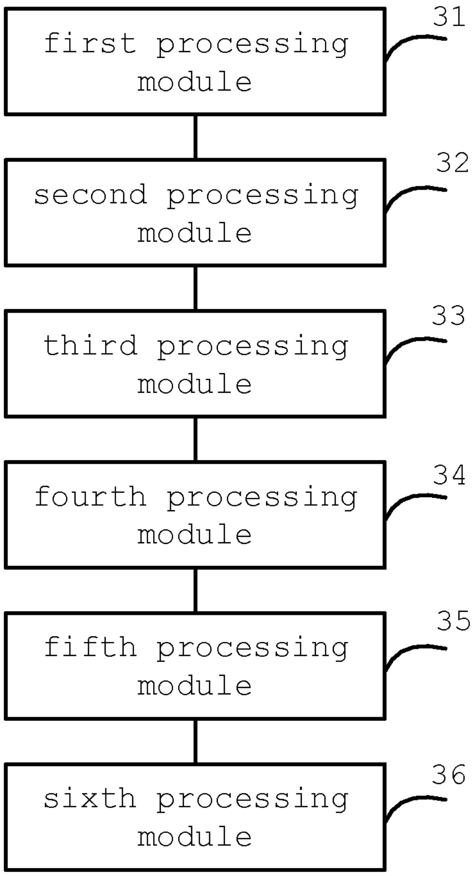
FIG. 3 is a schematic structural diagram of a multi-modal pre-training apparatus according to one embodiment of the present disclosure.

FIG. 3 is a schematic structural diagram of a multi-modal pre-training apparatus according to one embodiment of the present disclosure. As shown in FIG. 3, the multi-modal pre-training apparatus comprises a first processing module 31, a second processing module 32, a third processing module 33, a fourth processing module 34, a fifth processing module 35, and a sixth processing module 36.

The first processing module 31 is configured to sample the video in the video-text pair to obtain a first video frame sequence and is further configured to perform a word segmentation process on the text in the video-text pair to obtain a first word segmentation sequence.

In some embodiments, the video is sampled in an equidistant sampling manner to obtain the first video frame sequence.

In some embodiments, flags [CLS] and [SEP] are respectively provided at the beginning and end of the first word segmentation sequence, for convenience of subsequent processing.

The second processing module 32 is configured to mask the first video frame sequence to obtain a second video frame sequence and is further configured to mask the first word segmentation sequence to obtain a second word segmentation sequence.

In some embodiments, the video frames in the first video frame sequence are replaced with masks at random probabilities to obtain a second video frame sequence.

In some embodiments, the word segments in the first word segmentation sequence are replaced with masks at random probabilities to obtain a second word segmentation sequence.

The third processing module 33 is configured to encode the first video frame sequence to obtain a first video feature and is further configured to encode the first word segmentation sequence to obtain a first word segmentation feature.

In some embodiments, a video key-value encoder is used to encode the first video frame sequence to obtain a first video feature, and a sentence key-value encoder is used to encode the first word segmentation sequence to obtain a first word segmentation feature.

The first video feature outputted by the video key-value encoder reflects contextual characteristics of unmasked video frames. The first word segmentation feature outputted by the sentence key-value encoder reflects contextual characteristics of the unmasked word segmentation sequence.

The fourth processing module 34 is configured to encode the second video frame sequence to obtain a second video feature and is further configured to encode the second word segmentation sequence to obtain a second word segmentation feature.

In some embodiments, a video query encoder is used to encode the second video frame sequence to obtain the second video features, and a sentence query encoder is used to encode the second word segmentation sequence to obtain the second word segmentation feature.

The second video feature outputted by the video query encoder reflects a correlation between frames in the video modality, and the second word segmentation feature outputted by the sentence query encoder reflects a correlation between words in the text modality.

The fifth processing module 35 is configured to determine a pre-trained target function by using the first video feature, the first word segmentation feature, the second video feature, and the second word segmentation feature. In some embodiments, the fifth processing module 35 determines a first contrastive loss value by using the first word segmentation feature, the second video feature, and a preset first negative sample feature.

For example, an MLP model is used to convert the first word segmentation feature into a global first positive sample feature $$H_s^+.$$

The MLP model is used to convert the second video feature into a global video query feature $$H_v^m.$$

A first contrastive loss value is determined by using the video query feature $$H_v^m,$$

the first positive sample feature $$H_s^+,$$

and the first negative sample feature $$K_S^-.$$

In some embodiments, the first negative sample feature $$K_S^-$$

is as shown in Formula (1) above.

In some embodiments, the first contrastive loss value $$L_{NCE}^{V\to S}(H_V^m, H_S^+, K_s^-)$$

is calculated by using Formula (2) above.

The fifth processing module 35 determines a second contrastive loss value by using the first video feature, the second word segmentation feature and a preset second negative sample feature. For example, the MLP model is used to convert the first video feature into a global second positive sample feature $$H_v^+,$$

and the MLP model is used to convert the second word segmentation feature into a global text query feature $$H_s^m.$$

A second contrastive loss value is determined by using the text query feature $$H_s^m,$$

the second positive sample feature $$H_v^+,$$

and the second negative sample feature $$K_V^-.$$

In some embodiments, the second negative sample feature $$K_V^-$$

is as shown in Formula (3) above.

In some embodiments, the second contrastive loss value $$L_{NCE}^{S\to V}(H_S^m, H_V^+, K_V^-)$$

is calculated by using Formula (4) above.

The fifth processing module 35 determines a first target based on the first contrastive loss value and second contrastive loss value. In some embodiments, the first target is a sum of the first contrastive loss value and the second contrastive loss value. For example, the first target is calculated by using the above Formula (5). The first target is used to represent a combination of video-to-text and text-to-video matching losses.

The fifth processing module 35 determines a third contrastive loss value by using the first video feature, the second video feature, and the second negative sample feature. In some embodiments, the third contrastive loss value is determined by using the video query feature $$H_v^m,$$

the second positive sample feature $$H_v^+,$$

and the second negative sample feature $$K_V^-.$$

For example, the third contrastive loss value $$L_{NCE}^{V}(H_V^m, H_V^+, K_V^-)$$

is calculated by using Formula (6) above.

The fifth processing module 35 determines a fourth contrastive loss value by using the first word segmentation feature, the second word segmentation feature and the first negative sample feature. In some embodiments, the fourth contrastive loss value is determined by using the text query feature $$H_s^m,$$

the first positive sample feature $$H_s^+,$$

and the first negative sample feature $$K_S^-.$$

In some embodiments, the fourth contrastive loss value $$L_{NCE}^S(H_S^m, H_S^+, K_S^-)$$

is calculated by using Formula (7) above.

The fifth processing module 35 determines a second target based on the third contrastive loss value and the fourth contrastive loss value. In some embodiments, the second target is a sum of the third contrastive loss value and the fourth contrastive loss value. The second target is calculated, for example, by using the above Formula (8). The second target is used to represent denoising losses within a video modality and within a text modality.

The fifth processing module 35 determines a target function based on the first target and the second target. In some embodiments, the target function is a sum of the first target and the second target. For example, the target function L is calculated by using the above Formula (9).

In some embodiments, the fifth processing module 35 fuses the second video feature and the second word segmentation feature to obtain a fused feature. The fused feature is inputted to an MLM model to obtain a third target $L_{MLM}$, and the fused feature is inputted to an MSG model to obtain a fourth target $L_{MSG}$.

In some embodiments, the second video feature and the second word segmentation feature are fused by using a cross-modal decoder to obtain a fused feature. The cross-modal decoder is used for outputting the fused feature of the video and text multi-modal information and providing characteristic input for subsequent tasks.

In some embodiments, the target function L is determined from the first target $L_{Co\text{-}IM}$, the second target $L_{Co\text{-}ID}$, the third target $L_{MLM}$ and the fourth target $L_{MSG}$. In some embodiments, the target function L is a sum of the first target $L_{Co\text{-}IM}$, the second target $L_{Co\text{-}ID}$, the third target $L_{MLM}$ and the fourth target $L_{MSG}$. For example, the target function L is calculated by using the above Formula (10).

The sixth processing module 36 is configured to perform multi-modal pre-training by using a pre-trained target function.

Figure 4:
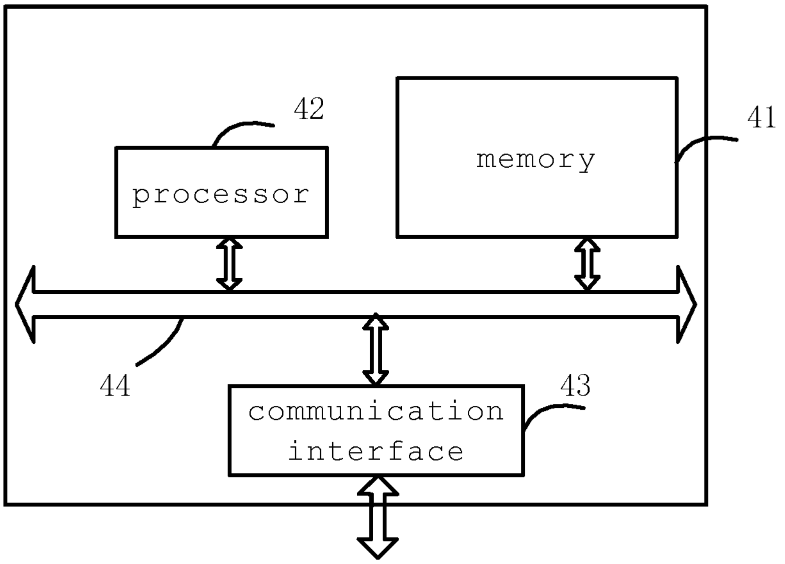
FIG. 4 is a schematic structural diagram of a multi-modal pre-training apparatus according to another embodiment of the present disclosure.

FIG. 4 is a schematic structural diagram of a multi-modal pre-training apparatus according to another embodiment of the present disclosure. As shown in FIG. 4, the multi-modal pre-training apparatus comprises a memory 41 and a processor 42.

The memory 41 is used for storing instructions, the processor 42 is coupled to the memory 41, and the processor 42 is configured to perform the method according to any one of the embodiments in FIG. 1 or FIG. 2 based on the instructions stored in the memory.

As shown in FIG. 4, the multi-modal pre-training apparatus further comprises a communication interface 43 for information interaction with other apparatuses. Meanwhile, the multi-modal pre-training apparatus further comprises a bus 44, wherein the processor 42, the communication interface 43 and the memory 41 communicate with each other via the bus 44.

The memory 41 may comprise a high-speed RAM memory, and may also comprise a non-volatile memory, such as at least one disk memory. The memory 41 may also be a memory array. The memory 41 may also be partitioned into blocks, and the blocks may be combined into virtual volumes according to certain rules.

Further, the processor 42 may be a central processing unit CPU, or may be an application specific integrated circuit ASIC, or one or more integrated circuits configured to implement embodiments of the present disclosure.

The present disclosure also relates to a computer-readable storage medium, wherein the computer-readable storage medium stores computer instructions, which, when executed by a processor, implement the method according to any one of the embodiments in FIG. 1 or FIG. 2.

Figure 5:
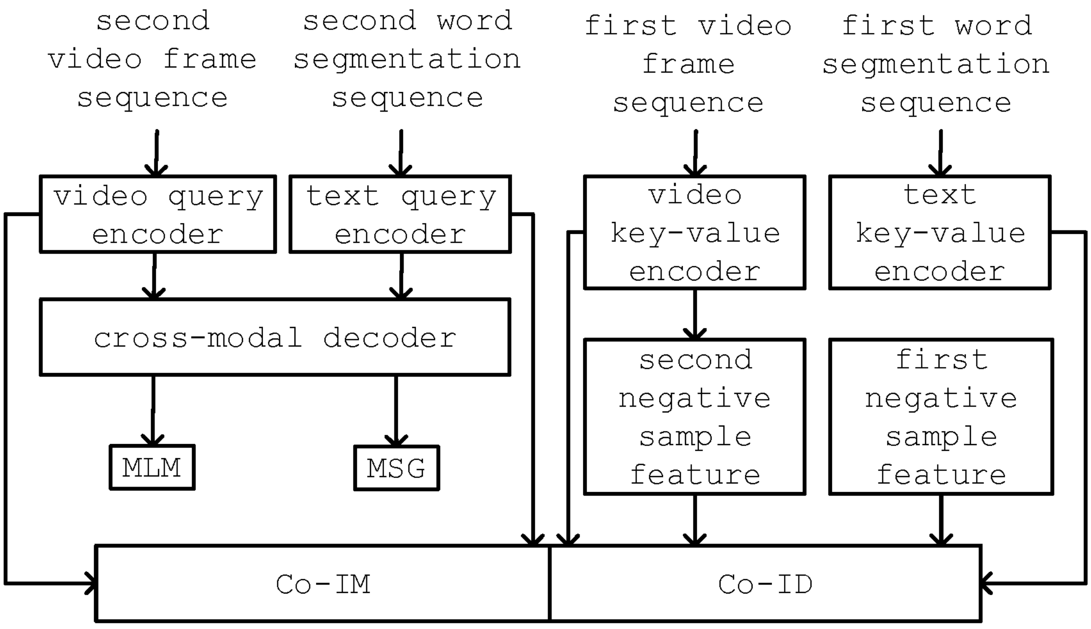
FIG. 5 is a schematic diagram of a multi-modal pre-training model according to one embodiment of the present disclosure.

FIG. 5 is a schematic diagram of a multi-modal pre-training model according to one embodiment of the present disclosure.

As shown in FIG. 5, a first video frame subsequence is obtained by sampling the video in the video-text pair, and a first word segmentation sequence is obtained by sampling the text in the video-text pair. The video frames in the first video frame sequence are replaced with masks at random probabilities to obtain a second video frame sequence. The word segments in the first word segmentation sequence are replaced with masks at random probabilities to obtain a second word segmentation sequence.

The first video frame sequence is encoded by using a video key-value encoder to obtain a first video feature, and the first word segmentation sequence is encoded by using a sentence key-value encoder to obtain a first word segmentation feature.

The second video frame sequence is encoded by using a video key-value encoder to obtain a second video feature, and the second word segmentation sequence is encoded by using a sentence key-value encoder to obtain a second word segmentation feature.

An MLP model is used for converting the first segmentation feature into a global first positive sample feature $$H_s^+,$$

the MLP model is used for converting the first video feature into a global second positive sample feature $$H_v^+,$$

the MLP model is used for converting the second video feature into a global video query feature $$H_v^m,$$

and the MLP model is used for converting the second word segmentation feature into a global text query feature $$H_s^m.$$

In a Co-IM (Contrastive Inter-modal Matching) module, a first contrastive loss value $$L_{NCE}^{V\to S}(H_V^m, H_S^+, K_S^-)$$

is determined by using the video query feature $$H_v^m,$$

the first positive sample feature $$H_s^+,$$

and the first negative sample feature $$K_S^-$$

according to the above Formula (2).

In some embodiments, the first negative sample feature $$K_S^-$$

is as shown in Formula (1) above.

A second contrastive loss value $$L_{NCE}^{S\to V}(H_S^m, H_V^+, K_V^-)$$

is determined by using the text query feature $$H_s^m,$$

the second positive sample feature $$H_v^+$$

and the second negative sample feature $$K_V^-$$

according to the Formula (4).

In some embodiments, the second negative sample feature $$K_V^-$$

is as shown in Formula (3) above.

Next, a first target $L_{Co\text{-}IM}$ is calculated by using the above Formula (5).

In a Co-ID (Contrastive Intra-mode Denoising) module, a third contrast loss value $$L_{NCE}^{V}(H_V^m, H_V^+, K_V^-)$$

is determined by using the video query feature $$H_V^m,$$

the second positive sample feature $$H_V^+,$$

and the second negative sample feature $$K_V^-$$

according to the above Formula (6).

A fourth contrastive loss value $$L_{NCE}^{S}(H_S^m, H_S^+, K_S^-)$$

is determined by using the text query feature $$H_S^m,$$

the first positive sample feature $$H_S^+,$$

and the first negative sample feature $$K_S^-$$

according to the Formula (7).

Next, a second target $L_{Co\text{-}ID}$ is determined based on the third contrastive loss value and the fourth contrastive loss value according to the above Formula (8).

In addition, the second video feature and the second word segmentation feature are fused by using a cross-modal decoder to obtain a fused feature. The fused feature is inputted into an MLM model to obtain a third target $L_{MLM}$, and the fused feature is inputted into an MSG model to obtain a fourth target $L_{MSG}$.

Next, by using the above Formula (10), a target function L is obtained by taking a sum of the first target $L_{Co-IM}$, the second target $L_{Co-ID}$, the third target $L_{MLM}$, and the fourth target $L_{MSG}$.

In some embodiments, the functional unit modules described above can be implemented as a general purpose processor, a Programmable Logic Controller (PLC), a Digital Signal Processor (DSP), an Application Specific Integrated Circuit (ASIC), a Field-Programmable Gate Array (FPGA) or other programmable logic devices, discrete gate or transistor logics, discrete hardware components, or any suitable combinations thereof for performing the functions described in this disclosure.

It will be appreciated by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to those skilled in this art. The embodiment was chosen and described in order to best explain principles and practical applications of the present disclosure, and to enable those skilled in the art to understand the disclosure so as to design various embodiments with various modifications as are suited to the particular use.

What is claimed is:

1. A multi-modal pre-training method, comprising:
- sampling a video in a video-text pair to obtain a first video frame sequence;
- performing word segmentation processing on a text in the video-text pair to obtain a first word segmentation sequence;
- masking on the first video frame sequence to obtain a second video frame sequence;
- masking on the first word segmentation sequence to obtain a second word segmentation sequence;
- encoding the first video frame sequence to obtain a first video feature, and encoding the first word segmentation sequence to obtain a first word segmentation feature;
- encoding the second video frame sequence to obtain a second video feature, and encoding the second word segmentation sequence to obtain a second word segmentation feature;
- determining a pre-trained target function by using the first video feature, the first word segmentation feature, the second video feature and the second word segmentation feature, wherein the determining the pre-trained target function comprises:
  - determining a first contrastive loss value by using the first word segmentation feature, the second video feature and a preset first negative sample feature;
  - determining a second contrastive loss value by using the first video feature, the second word segmentation feature and a preset second negative sample feature;
  - determining a first target based on the first contrastive loss value and second contrastive loss value;
  - determining a third contrastive loss value by using the first video feature, the second video feature, and the second negative sample feature;
  - determining a fourth contrastive loss value by using the first word segmentation feature, the second word segmentation feature, and the first negative sample feature;
  - determining a second target according to the third contrastive loss value and the fourth contrastive loss value; and
  - determining the target function according to the first target and the second target; and
- performing multi-modal pre-training by using the pre-trained target function.

2. The multi-modal pre-training method of claim 1, wherein the determining the first contrastive loss value comprises:
- converting the first word segmentation feature into a global first positive sample feature;
- converting the second video feature into a global video query feature; and
- determining the first contrastive loss value by using the video query feature, the first positive sample feature, and the first negative sample feature.

3. The multi-modal pre-training method of claim 2, wherein the determining the second contrastive loss value comprises:
- converting the first video feature into a global second positive sample feature;
- converting the second word segmentation feature into a global text query feature; and
- determining the second contrastive loss value by using the text query feature, the second positive sample feature, and the second negative sample feature.

4. The multi-modal pre-training method of claim 3, wherein the determining the third contrastive loss value comprises:
- determining the third contrastive loss value by using the video query feature, the second positive sample feature, and the second negative sample feature.

5. The multi-modal pre-training method of claim 4, wherein the determining the fourth contrastive loss value comprises:
- determining the fourth contrastive loss value by using the text query feature, the first positive sample feature, and the first negative sample feature.

6. The multi-modal pre-training method of claim 1, wherein:
- the first target is a sum of the first contrastive loss value and the second contrastive loss value; and
- the second target is a sum of the third contrastive loss value and the fourth contrastive loss value.

7. The multi-modal pre-training method of claim 1, wherein
- the target function is a sum of the first target and the second target.

8. The multi-modal pre-training method of claim 1, further comprising:
- fusing the second video feature and the second word segmentation feature to obtain a fused feature; and
- inputting the fused feature into a masked language modelling (MLM) model to obtain a third target, and inputting the fused feature into a masked language generating (MSG) model to obtain a fourth target,
- wherein the determining the target function according to the first target and the second target comprising:

determining the target function according to the first target, the second target, the third target and the fourth target.

9. The multi-modal pre-training method of claim 8, wherein the target function is a sum of the first target, the second target, the third target, and the fourth target.

10. A multi-modal pre-training apparatus, comprising:

a memory; and a processor coupled to the memory, which is configured to execute a multi-modal pre-training method comprising:

sampling a video in a video-text pair to obtain a first video frame sequence;

performing word segmentation processing on a text in the video-text pair to obtain a first word segmentation sequence;

masking on the first video frame sequence to obtain a second video frame sequence;

masking on the first word segmentation sequence to obtain a second word segmentation sequence;

encoding the first video frame sequence to obtain a first video feature, and encoding the first word segmentation sequence to obtain a first word segmentation feature;

encoding the second video frame sequence to obtain a second video feature, and encoding the second word segmentation sequence to obtain a second word segmentation feature;

determining a pre-trained target function by using the first video feature, the first word segmentation feature, the second video feature and the second word segmentation feature, wherein the determining the pre-trained target function comprises:

determining a first contrastive loss value by using the first word segmentation feature, the second video feature and a preset first negative sample feature;

determining a second contrastive loss value by using the first video feature, the second word segmentation feature and a preset second negative sample feature;

determining a first target based on the first contrastive loss value and second contrastive loss value;

determining a third contrastive loss value by using the first video feature, the second video feature, and the second negative sample feature;

determining a fourth contrastive loss value by using the first word segmentation feature, the second word segmentation feature, and the first negative sample feature;

determining a second target according to the third contrastive loss value and the fourth contrastive loss value; and determining the target function according to the first target and the second target; and performing multi-modal pre-training by using the pre-trained target function.

11. A non-transitory computer-readable storage medium, which stores a computer program that, when executed by a processor, performs a multi-modal pre-training method comprising:

sampling a video in a video-text pair to obtain a first video frame sequence;

performing word segmentation processing on a text in the video-text pair to obtain a first word segmentation sequence;

masking on the first video frame sequence to obtain a second video frame sequence;

masking on the first word segmentation sequence to obtain a second word segmentation sequence;

encoding the first video frame sequence to obtain a first video feature, and encoding the first word segmentation sequence to obtain a first word segmentation feature;

encoding the second video frame sequence to obtain a second video feature, and encoding the second word segmentation sequence to obtain a second word segmentation feature;

determining a pre-trained target function by using the first video feature, the first word segmentation feature, the second video feature and the second word segmentation feature, wherein the determining the pre-trained target function comprises:

determining a first contrastive loss value by using the first word segmentation feature, the second video feature and a preset first negative sample feature;

determining a second contrastive loss value by using the first video feature, the second word segmentation feature and a preset second negative sample feature;

determining a first target based on the first contrastive loss value and second contrastive loss value;

determining a third contrastive loss value by using the first video feature, the second video feature, and the second negative sample feature;

determining a fourth contrastive loss value by using the first word segmentation feature, the second word segmentation feature, and the first negative sample feature;

determining a second target according to the third contrastive loss value and the fourth contrastive loss value; and determining the target function according to the first target and the second target; and performing multi-modal pre-training by using the pre-trained target function.

12. The multi-modal pre-training apparatus of claim 10, wherein the determining the first contrastive loss value comprises:

converting the first word segmentation feature into a global first positive sample feature;

converting the second video feature into a global video query feature; and determining the first contrastive loss value by using the video query feature, the first positive sample feature, and the first negative sample feature.

13. The multi-modal pre-training apparatus of claim 12, wherein the determining the second contrastive loss value comprises:

converting the first video feature into a global second positive sample feature;

converting the second word segmentation feature into a global text query feature; and determining the second contrastive loss value by using the text query feature, the second positive sample feature, and the second negative sample feature.

14. The multi-modal pre-training apparatus of claim 13, wherein the determining the third contrastive loss value comprises:

determining the third contrastive loss value by using the video query feature, the second positive sample feature, and the second negative sample feature.

15. The multi-modal pre-training apparatus of claim 14, wherein the determining the fourth contrastive loss value comprises:

determining the fourth contrastive loss value by using the text query feature, the first positive sample feature, and the first negative sample feature.

16. The multi-modal pre-training apparatus of claim 10, wherein the first target is a sum of the first contrastive loss value and the second contrastive loss value; and the second target is a sum of the third contrastive loss value and the fourth contrastive loss value.

17. The multi-modal pre-training apparatus of claim 10, wherein the target function is a sum of the first target and the second target.

18. The multi-modal pre-training apparatus of claim 10, wherein the multi-modal pre-training method further comprises:

fusing the second video feature and the second word segmentation feature to obtain a fused feature; and inputting the fused feature into a masked language modelling (MLM) model to obtain a third target, and inputting the fused feature into a masked language generating (MSG) model to obtain a fourth target, and wherein the determining the target function according to the first target and the second target comprises:

determining the target function according to the first target, the second target, the third target and the fourth target.

* * * * *